United States Patent Office.

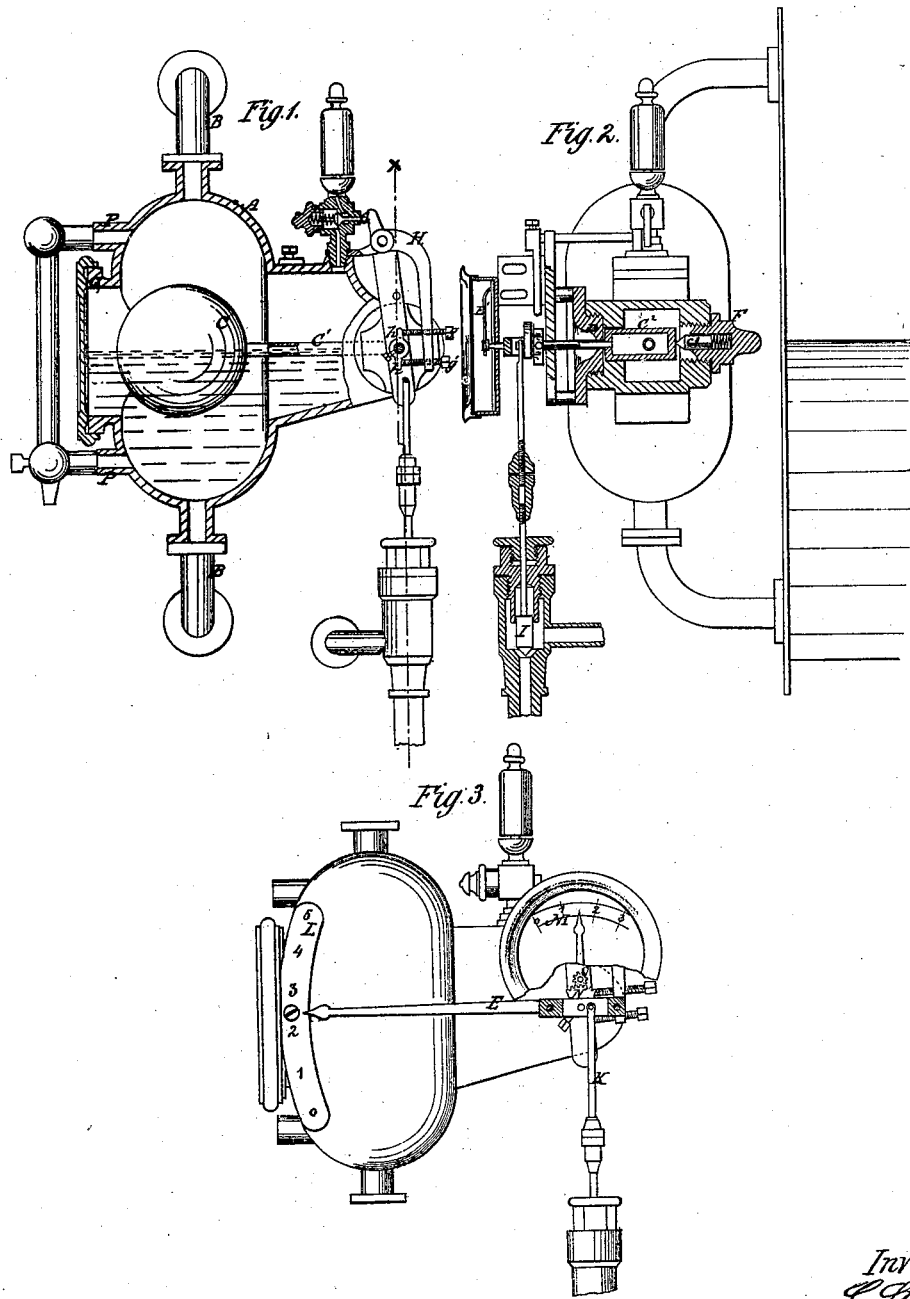

LEOPOLD STEIGERT, OF CINCINNATI, OHIO.

Letters Patent No. 95,533, dated October 5, 1869.

---

IMPROVEMENT IN BOILER WATER-REGULATORS AND ALARM.

---

The Schedule referred to in these Letters Patent and making part of the same.

---

*To all whom it may concern:*

Be it known that I, LEOPOLD STEIGERT, of Cincinnati, in the county of Hamilton, and State of Ohio, have invented a new and improved Water-Regulator, Alarm, and Indicator for Steam-Boilers; and I do hereby declare that the following is a full, clear, and exact description thereof, which will enable those skilled in the art to make and use the same, reference being had to the accompanying drawings, forming part of this specification.

This invention relates to improvements in apparatus for automatically regulating the supply of water for steam-boilers; also for indicating the height of the water in the boiler, and for actuating the alarm-whistle when either too high or too low.

It consists of the arrangement of a float in a vessel, attached to the side of the boiler, in a manner to oscillate a shaft carrying indicators, and actuating the whistle-valve, and a plug in the supply-pipe, whereby the whistle may be caused to blow at the proper time, and the water is allowed to flow to the pump when required, or shut off when not needed.

Figure 1 represents a side view of my improved apparatus, partly in section and partly in elevation, and with some parts removed;

Figure 2 represents a transverse vertical section, on the line $x\ x$ of fig. 1; and Figure 3 represents a side elevation, with a part of the dial broken away.

Similar letters of reference indicate corresponding parts.

A represents a vessel, which may be attached to the boiler by the pipes B B, so that the central portion will be at about the water-line of the boiler.

C represents a hollow float, connected by the hollow arm $c^1$ to the oscillating shaft $c^2$, suspended at one end on the spring-centre $c^3$, the other end projecting through the cap D, and supporting the pointers E and E'.

This shaft is also made hollow, and affords a communication from the atmosphere to the interior of the float for a free circulation of air.

It is also enlarged within the vessel, and presents a shoulder against the interior face of the cap D, which is pressed against the said cap by the spring-centre D, to maintain a steam-tight joint.

F represents a screw-plug, whereby the tension of the spring bearing against the centre $c^3$ may be adjusted.

G represents the stem of the whistle-valve; and

H, a lever, the upper end of which bears against the said stem, while the lower end is provided with set-screws $g$ and $g'$, which may be so adjusted against the wipers $h\ h$, on the shaft $c^2$, as to cause the said lever to open the whistle-valve, either when the water is high or low, or either one of the set-screws may be set out of the reach of the wipers, and the whistle caused to blow only when the ball moves in one direction.

I represents a water-plug set in the supply-pipe, and connected by the rod K to the pointer E, and so arranged that when the float C rises, by reason of high water, the said plug will be closed down and stop the flow of water to the pump, and when the float goes down the plug will open the passage, and allow the pump to feed again.

L and M represent scales, over which the pointers work, to indicate the state of the water.

N represents a toothed segment on the shaft $c^2$; and

O, a pinion, which may be arranged to gear therein, to which a pointer may be connected, which will have a much greater range than the pointer E'.

P and P' represent pipe-connections, to which a glass water-gauge may be attached, if preferred; and Q represents an opening through the side of the vessel A, for inserting the float C, the said opening Q being provided with a cap, suitably secured.

If it be desirable to use the apparatus as a water-gauge only, the plug-connection and whistle may be dispensed with, and if for a steam-trap, the plug may be dispensed with, and a pipe-connection made from the plug-cylinder to the lower pipe-connection B.

It will be observed that this entire apparatus may be constructed on a small scale and very cheaply, and is adapted to boilers of any character.

I claim as new, and desire to secure by Letters Patent—

1. The arrangement, with the shaft $c^2$, provided with the wipers $h\ h$ of the whistle-valve G, lever H, and set-screws $g$ and $g'$, substantially as and for the purpose described.

2. The arrangement of the water-plug I, connecting-arm E, and shaft $c^2$, substantially as and for the purpose described.

LEOPOLD STEIGERT.

Witnesses:
JOHN H. KRIEGER,
JOHN WOODVILLE.